(12) United States Patent
van der Griendt (10) Patent No.: US 8,021,099 B1
(45) Date of Patent: Sep. 20, 2011

(54) REVERSED VENTURI SYSTEM FOR SEPARATING AND FEEDING NESTED FOAM CUPS

(75) Inventor: Pieter S. van der Griendt, Far Hills, NJ (US)

(73) Assignee: Polytype America Corporation, Mahwah, NJ (US)

( * ) Notice: Subject to any disclaimer, the term of this patent is extended or adjusted under 35 U.S.C. 154(b) by 707 days.

(21) Appl. No.: 11/875,910

(22) Filed: Oct. 21, 2007

(51) Int. Cl.
*B65G 59/00* (2006.01)
*B65B 57/20* (2006.01)
*B65H 67/06* (2006.01)

(52) U.S. Cl. ............... 414/795.6; 221/221; 221/277; 414/797.9

(58) Field of Classification Search .......... 221/278; 406/12, 17, 52, 77; 414/788.1–788.4, 789.5, 414/789.9, 790.3, 790.7, 795.5–795.6, 796, 414/796.6, 797.9, 798.4
See application file for complete search history.

(56) References Cited

U.S. PATENT DOCUMENTS

| | | | | |
|---|---|---|---|---|
| 2,912,282 A * | 11/1959 | Schult | ............................. | 406/52 |
| 3,086,822 A * | 4/1963 | Fibish | ............................. | 406/79 |
| 3,099,120 A * | 7/1963 | Bruun | ............................. | 53/313 |
| 3,389,811 A * | 6/1968 | Frank | ............................. | 73/45.3 |
| 3,497,086 A * | 2/1970 | Schnepp et al. | ........... | 414/798.4 |
| 3,907,161 A | 9/1975 | Martin | | |
| 4,392,439 A * | 7/1983 | Herriau | ........................ | 111/176 |
| 4,418,837 A | 12/1983 | Kontz | | |
| 4,545,714 A * | 10/1985 | Johnson et al. | ............ | 414/788.2 |
| 4,741,458 A * | 5/1988 | Odorici | ........................ | 221/221 |
| 6,558,109 B2 | 5/2003 | Gibbel | | |
| 6,623,236 B1 | 9/2003 | Barnes | | |

FOREIGN PATENT DOCUMENTS

JP 58109325 A * 6/1983

* cited by examiner

*Primary Examiner* — Gregory Adams
(74) *Attorney, Agent, or Firm* — Richard M. Goldberg (57) ABSTRACT

An apparatus for separating nested foam cups, includes a support for guiding a stack of nested foam cups in a first direction to a mandrel for printing thereon; a first annular opening in the support for supplying an annular supply of pressurized air to a position between a forwardmost foam cup and a next adjacent nested foam cup such that the pressurized air travels in a second direction having a component opposite to the first direction and such that the pressurized air travels in a cavity between the forwardmost cup and the nested adjacent cup to separate the forwardmost cup from the next adjacent cup; and second openings in the support downstream of the first annular opening for supplying pressurized air to the separated forwardmost cup in order to further advance the forwardmost cup toward the mandrel.

16 Claims, 9 Drawing Sheets

REVERSED VENTURI SYSTEM FOR SEPARATING AND FEEDING NESTED FOAM CUPS

BACKGROUND OF THE INVENTION

The present invention relates generally to separating nested cups and feeding the separated cups for further processing, and more particularly, is directed to a high speed machine for separating nested foam cups and feeding the cups for further processing using a venturi air pressure arrangement.

Printing machines which print on cylindrical or frusto-conical shaped drinking cups made of a material sold under the trademark "STYROFOAM" are known in the art. Hereinafter, reference to a foam material is intended to encompass the material sold under the trademark "STYROFOAM."

Generally, in machines of this type, there is a rotatable printing blanket cylinder having a plurality of rubber printing blankets mounted thereon which sequentially pass by different inking assemblies. Each inking assembly has a different color which can be applied to a printing plate associated with it and the printing plate transfers ink to each blanket. When the printing blanket has passed the last inking assembly, all of the desired colors have been placed thereon to form a composite color image.

A rotatable cylinder is also provided and has different mandrels thereon which are each supplied sequentially from a feed assembly with a cup to be printed. As the cup on each respective mandrel passes in front of the printing blanket, it is rotated so that an entire image is printed on the external surface of the cup. The cup is then removed at a subsequent take-off location.

Specifically, each cup is held on a mandrel by vacuum pressure. The cups are stacked or nested, and are supplied one at a time from a tube or track to the mandrel at the infeed station. However, problems result when the cups are made of a foam material. Conventionally, there are mechanical means with air jet assists for moving the cups onto the mandrel. For example, there are rotating guides or stops on diametrically opposite sides of the nested cups, each of which has a finger or arcuate cam which is adapted to restrain the forward end of the forwardmost cup. When a shaft on which the rotating guides are mounted, is rotated, such that the fingers are positioned in blocking relation in front of the forwardmost cup, the forwardmost cup is restrained. However, when the shaft is rotated 180 degrees, the fingers are moved out of the blocking relationship so that the forwardmost cup is free and can be sucked onto the mandrel by vacuum pressure applied through the central opening of the mandrel and by air jet assists.

The problem with the prior art is that, because the cups are made of foam material, that is a material sold under the trademark "STYROFOAM," they tend to stick together, and it is difficult to separate the cups. As a result, it is impossible to provide a high speed operation.

In accordance with the prior art, a small number of air jets are provided which direct compressed air to the space between the first or forwardmost cup and the second or next cup to aid in separating these cups. In addition, other air jets are provided which are directed in front of the first cup in the opposite direction toward the mandrel to create a suction or vacuum for pulling the first cup out and onto the mandrel. However, even with these air jets, separation of the cups becomes difficult.

The inventor herein has discovered that the reason it is difficult to separate the cups, even with such air jets, is because there only are a discrete number of air jets, for example, between four and eight air jets. As a result, the air from an air jet travels in the gap between the first and second cups, on one side of first cup, and exits in the gap on another side of the first cup. However, as the air flow exits the gap between the first and second cups, it creates a vacuum which tends to pull the cups together, thereby defeating the purpose of the air flow.

SUMMARY OF THE INVENTION

Accordingly, it is an object of the present invention to provide an air pressure arrangement for separating nested foam cups that overcomes the aforementioned problems.

It is another object of the present invention to provide an air pressure arrangement for separating nested foam cups in which an annular ring of compressed air is supplied between two cups in order to separate the two cups, while preventing a vacuum from forming between the cups.

It is still another object of the present invention to provide an air pressure arrangement for separating nested foam cups in which the compressed air travels to the bottom of the forwardmost cup and has only one way to go, that is, to force this cup out of the nesting arrangement in order to clearly and absolutely separate this cup from the next cup, so that the problem of sticking of the cups is thereby overcome.

It is yet another object of the present invention to provide an air pressure arrangement for separating nested foam cups that is easy to use and economical to manufacture.

In accordance with an aspect of the present invention, an apparatus for separating nested articles, includes a support for guiding a stack of nested articles in a first direction from one location to another location in a nested arrangement; and a peripheral opening in the support for supplying a peripheral supply of pressurized air to a position between a forwardmost article of the stack and a nested adjacent article such that the pressurized air travels in a second direction having a component opposite to the first direction and such that the pressurized air travels in a cavity between the forwardmost article and the nested adjacent article to separate the forwardmost article from the next adjacent article.

Preferably, the peripheral opening is angled with respect to the first direction and is a narrow peripheral venturi opening in the shape of a cone. In this regard, the support includes a first peripheral member having a projection with a first peripheral angled surface and an adjacent second peripheral member having a projection with a second peripheral angled surface adjacent to and spaced slightly away from the first angled surface to define the peripheral opening therebetween.

Preferably, the articles are foam cups.

There is also at least one second opening in the support downstream of the peripheral opening for supplying pressurized air to the forwardmost article separated by the peripheral supply of pressurized air from the peripheral opening, in order to further advance the forwardmost article. The at least one second opening is angled with respect to the first direction and is also preferably a narrow venturi opening.

There is also a moving arrangement for moving the nested articles to a position to be acted upon by the peripheral supply of pressurized air from the peripheral opening. The moving arrangement includes at least one opening in the support, at least one endless belt extending through the at least one opening for engaging the articles to move the articles along the support, and a drive arrangement for rotating the at least one endless belt.

In accordance with another aspect of the present invention, an apparatus for separating nested foam cups, includes a support for guiding a stack of nested foam cups in a first direction to a mandrel for printing thereon; and a first annular opening in the support for supplying an annular supply of pressurized air to a position between a forwardmost one of the nested foam cups and a next adjacent foam cup in a nesting arrangement with the forwardmost foam cup such that the pressurized air travels in a second direction having a component opposite to the first direction and such that the pressurized air travels in a cavity between the forwardmost cup and the nested adjacent cup to separate the forwardmost cup from the next adjacent cup. There is also at least one second opening in the support downstream of the first annular opening for supplying pressurized air to the forwardmost cup separated by the annular supply of pressurized air from the first annular opening, in order to further advance the forwardmost cup toward the mandrel.

The above and other objects, features and advantages of the invention will become readily apparent from the following detailed description thereof which is to be read in connection with the accompanying drawing.

DETAILED DESCRIPTION

Figure 1:
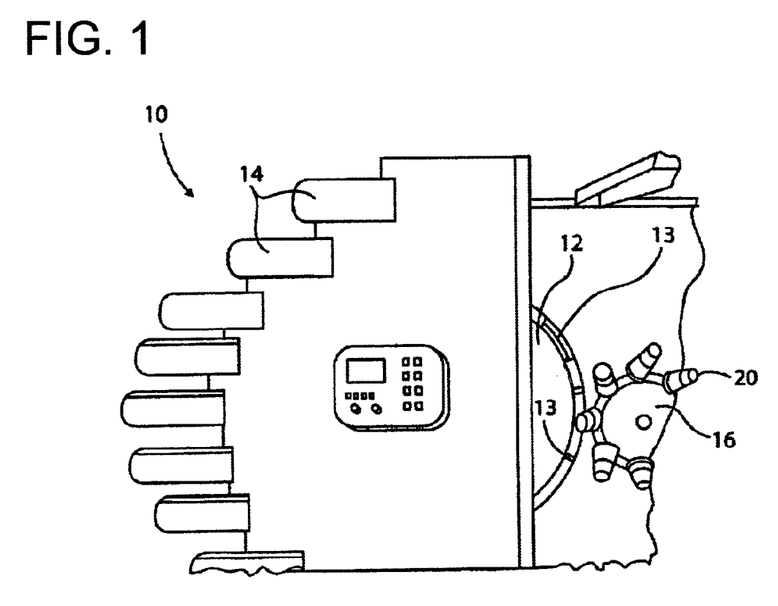
FIG. 1 is a perspective view of a printing machine according to the present invention.
Figure 2:
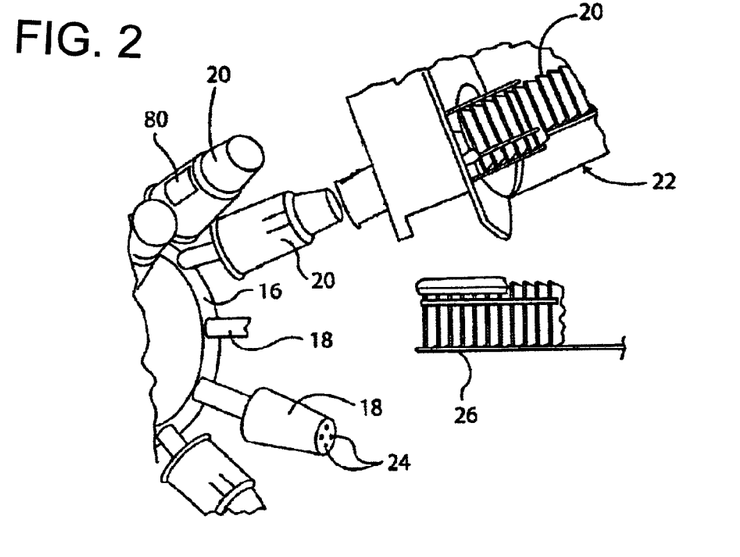
FIG. 2 is a perspective view of the infeed and take-off assemblies of the printing machine of FIG. 1.

Referring to the drawings, and initially to FIGS. 1 and 2, a machine 10 for printing on frusto-conical shaped foam cups, with which the present invention can be used, will now be described. Machine 10 includes a rotatable printing blanket cylinder 12 having a plurality of rubber printing blankets 13 thereon. Printing blanket cylinder 12 sequentially passes by different inking assemblies 14 arranged in spaced relation around printing blanket 12. Each inking assembly 14 is arranged to apply a different color to printing blankets 13.

When a printing blanket 13 has passed by the last inking assembly 14, all of the selected colors will have been placed on printing blanket 13, to form a composite color image thereon.

A rotatable cylinder 16 is provided having different mandrels 18 spaced apart at the circumferential edge thereof. Each mandrel 18 is supplied sequentially with a foam cup 20 having an exterior surface to be printed by printing blanket 13. Cups 20 are supplied in a stacked relation, as shown in FIG. 2, from a feeder conveyor 22 which is preferably inclined. Each mandrel 18 has bore holes 24 therein which are in fluid communication with a vacuum supply (not shown) associated with each mandrel 18 to hold the cup 20 thereon, as is well known.

As the cup 20 on each respective mandrel 18 passes to the printing position of printing blanket 13, that mandrel 18 is rotated about its own axis. The printing position can occur at any angular position, but is preferably located at the clock position of nine o'clock (9:00) of rotatable cylinder 16. Since the cup 20 in this printing position is in contact with printing blanket 13, an image is printed on the external surface of the cup 20. Rotatable cylinder 16 is then rotated in order to sequentially move a new mandrel 18 and cup 20 thereon to the printing position and to move the printed cups 20 to a take-off position, for example, at a clock position of three o'clock (3:00). At the take-off position, the vacuum associated with each mandrel 18 is released, and air jets are provided through bore holes 24 to blow the printed cup 20 off the mandrel 18 and into a stack of printed cups on a take-off conveyor 26 or the like.

A printing apparatus of the above described type is sold by the assignee of the present application, Polytype America, Inc.

The problem with such a machine 10 is that, because the cups are made of a material sold under the trademark "STYROFOAM" (hereinafter referred to as a foam material), they tend to stick together, and it is difficult to separate the cups. As a result, it is impossible to provide a high speed operation.

Referring now to FIGS. 3-7, according to the present invention, a first infeed tube 28 is provided for conveying cups 20 in a nested arrangement to mandrels 18, and is supported at least by a first infeed tube support arrangement 30 at a distal end thereof and a second infeed tube support arrangement 32 at a position spaced inwardly from the distal end. A second infeed tube 34 is arranged coaxially with first infeed tube 28 and spaced inwardly or proximally thereof. The input end of second infeed tube 34 is spaced away from the output end of first infeed tube 28 so as to provide a gap therebetween, and a collar 36 is mounted in the gap to provide support continuity for nested cups 20, whereby the nested cups 20 from first infeed tube 28 pass through collar 36 into second infeed tube 34.

Elongated slots or openings 38 (FIGS. 4 and 5) are provided on the diametrically opposite sides of second infeed tube 34 so that cups 20 can be driven toward the outlet opening in second infeed tube 34 (at the left of FIG. 3) by a first side endless timing belt 40 and an opposite second side endless timing belt 42, respectively.

Figure 3:
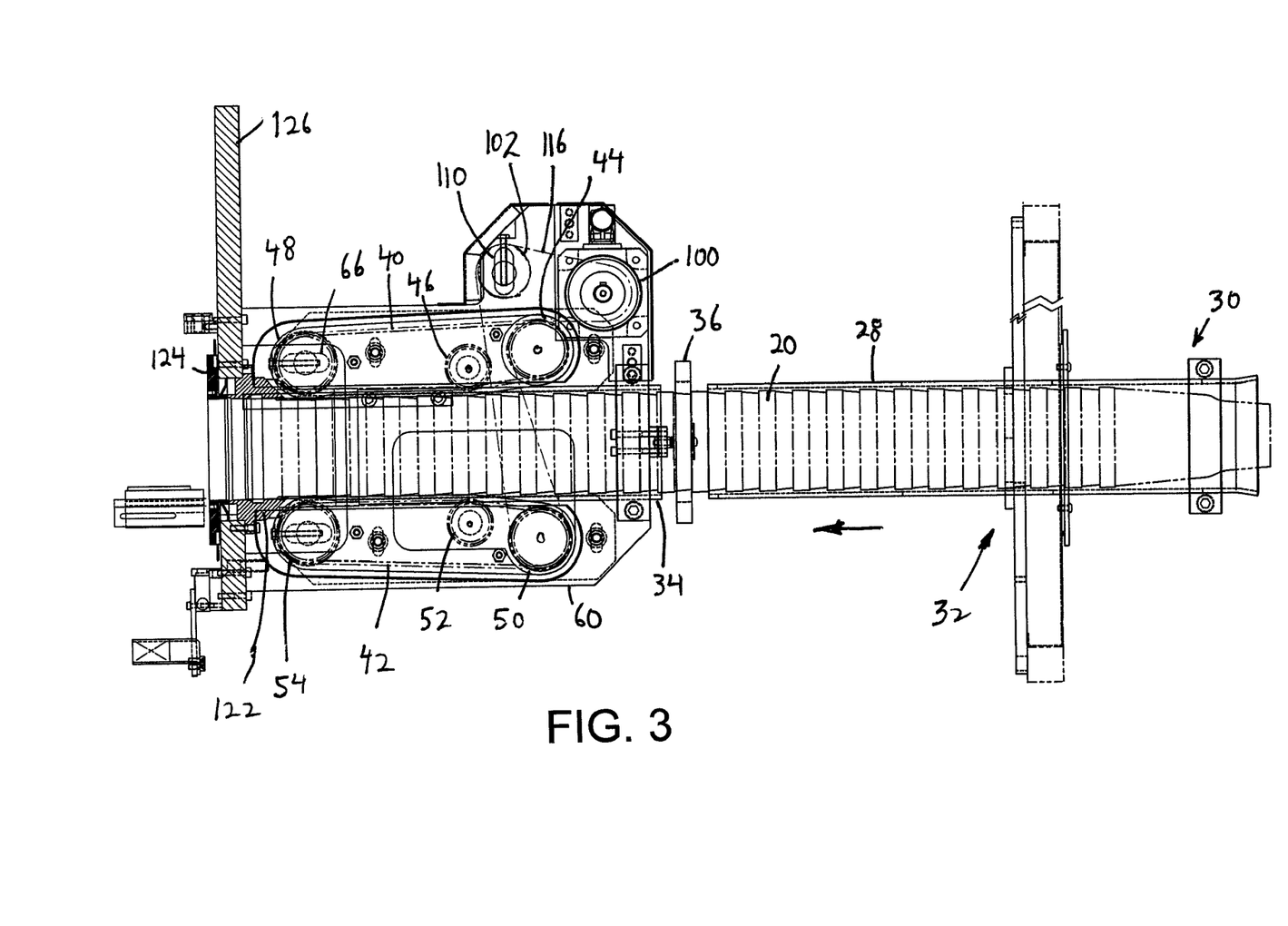
FIG. 3 is a top plan view, partly in section, of the infeed assembly.

First side endless timing belt 40 extends around a drive pulley 44, an idler pulley 46 and a tightening pulley 48 such that first side endless timing belt 40 extends through the respective elongated opening 38 into light contact with the outer surfaces of cups 20, while second side endless timing belt 42 extends around a drive pulley 50, an idler pulley 52 and a tightening pulley 54 such that second side endless timing belt 42 extends through the opposite elongated opening 38 into light contact with the opposite outer surfaces of cups 20.

Figures 5, 6, 7:
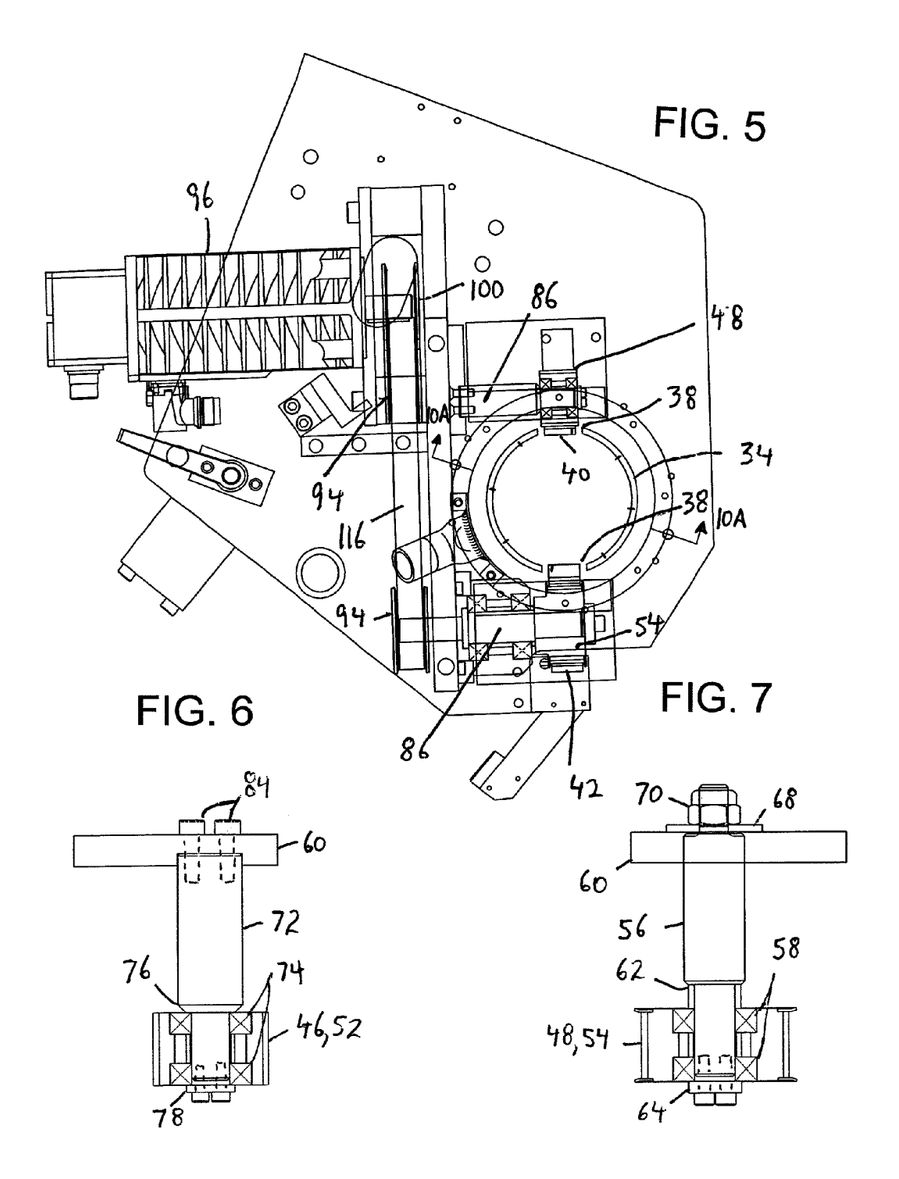
FIG. 5 is an end elevational view, partly in section, of the infeed assembly.
FIG. 6 is an enlarged top plan view of an idler pulley arrangement of the infeed assembly.
FIG. 7 is an enlarged top plan view of the tightener pulley arrangement of the infeed assembly.

Specifically, as shown best in FIG. 7, tightening pulleys 48 and 54 are each rotatably mounted on a tightener shaft 56 via bearings 58, with tightener shaft 56 in turn, being mounted to a frame member 60. It will be appreciated that tightener shaft 56 has a reduced diameter end so as to form an annular shoulder 62 thereat in order to correctly position the tightening pulley 48, 54 thereon, and a shaft cap 64 restrains the tightening pulley 48, 54 thereon. The opposite end of tightener shaft 56 extends through an elongated slot 66 (FIG. 3) in frame member 60, and is securely held at a desired position of slot 66 by a washer 68 and nut 70. In this manner, the position of tightener shaft 56 in slot 66 can be adjusted to a desired position in order to maintain timing belt 40, 42 taut about pulleys 44, 46, 48; 50, 52, 54.

As best shown in FIG. 6, idler pulleys 46 and 52 are each rotatably mounted on an idler shaft 72 via bearings 74, with idler shaft 72 in turn, being mounted to frame member 60. It will be appreciated that idler shaft 72 has a reduced diameter end so as to form an annular shoulder 76 thereat in order to correctly position the idler pulley 46, 52 thereon, and a shaft cap 78 restrains the idler pulley 46, 52 thereon. The opposite end of idler shaft 72 is securely held to frame member 60 by bolts 84.

Figure 8:
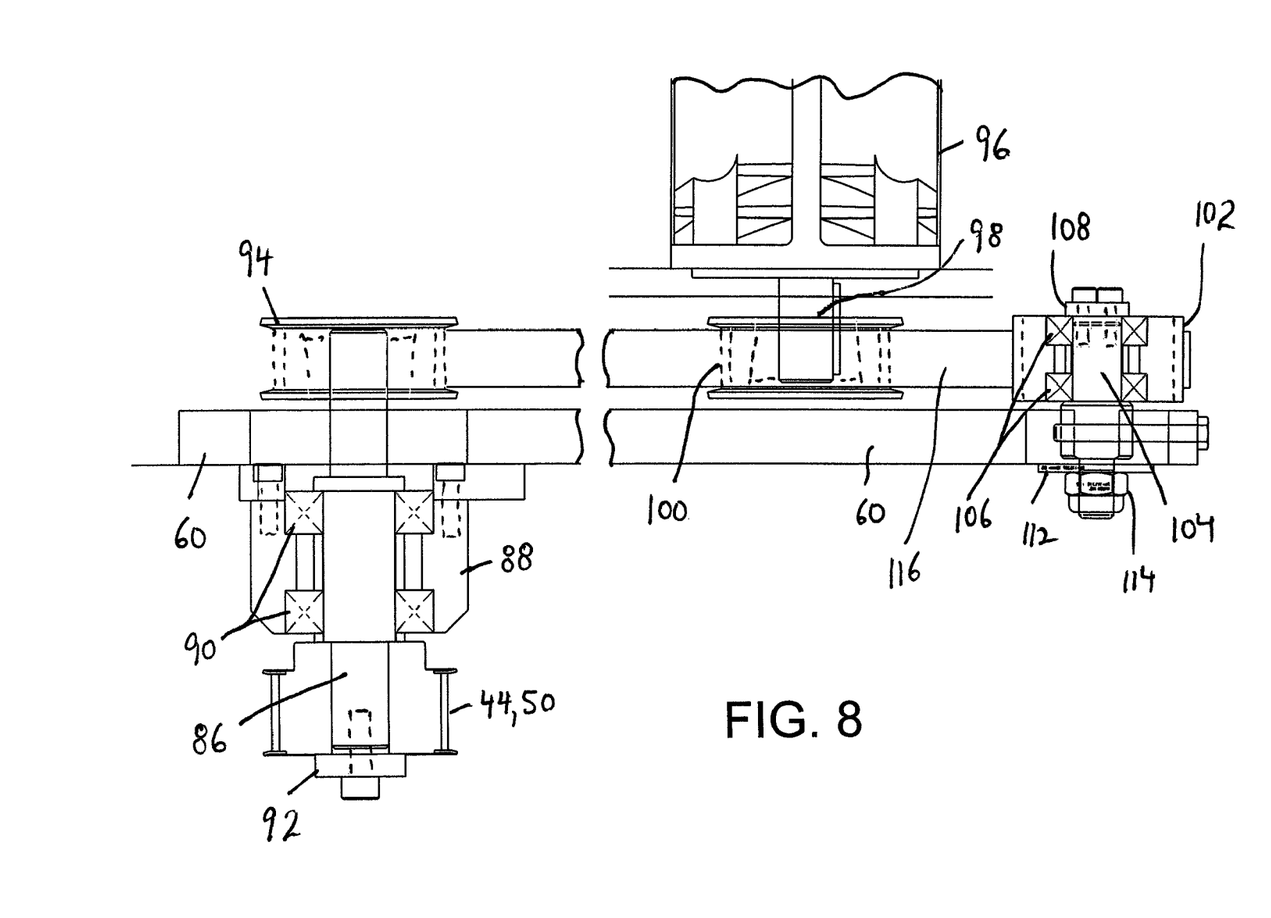
FIG. 8 is an enlarged top plan view of the motor drive arrangement of the infeed assembly.
Figures 9, 10A:
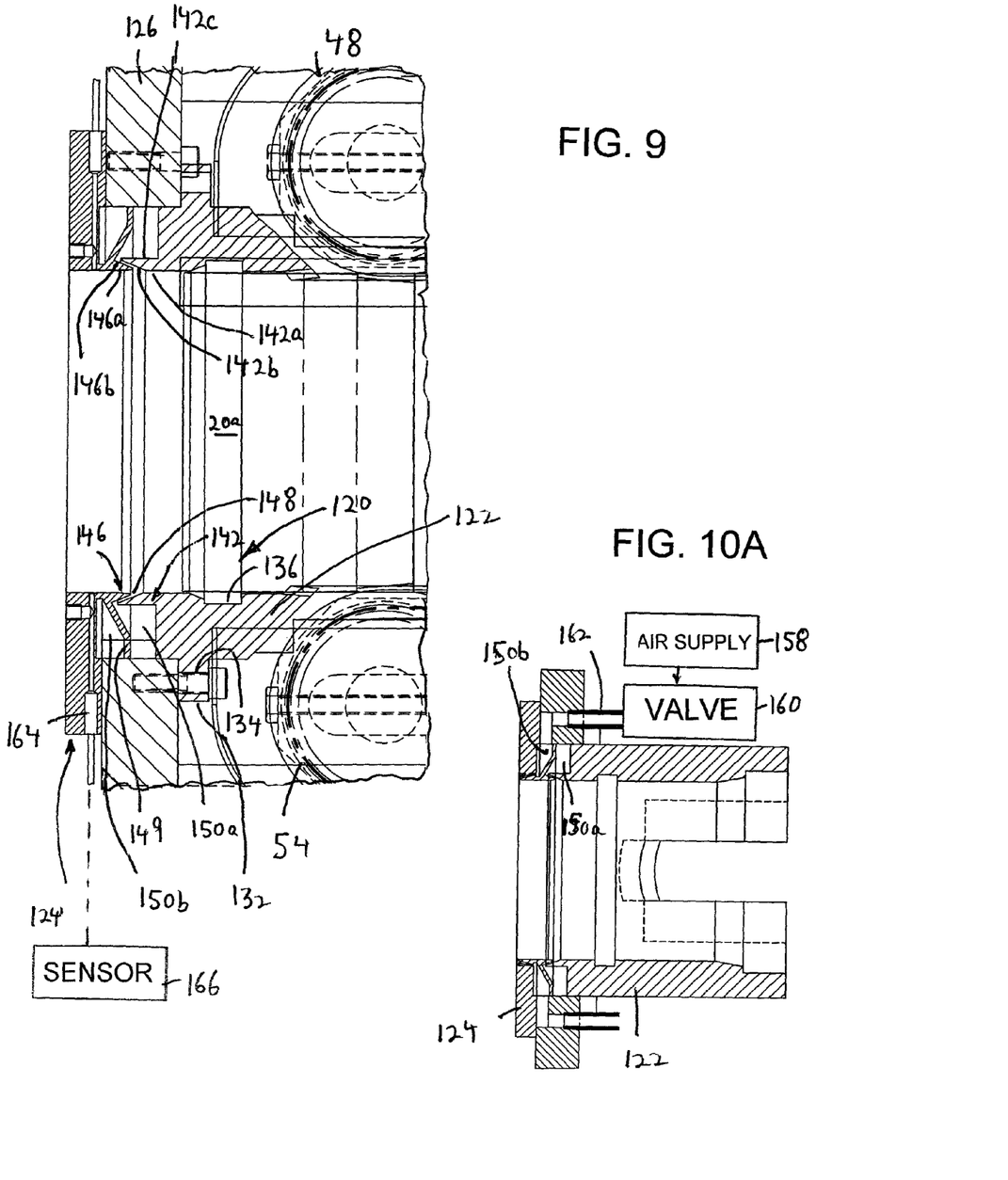
FIG. 9 is an enlarged longitudinal cross-sectional view of the outlet end of the infeed assembly of FIG. 2.
FIG. 10A is an enlarged cross-sectional view, similar to FIGS. 9 and 10, taken along line FIGS. 10A-10A of FIG. 5.

As best shown in FIGS. 3 and 8, drive pulleys 44 and 50 are each non-rotatably fixed on a drive shaft 86. A housing member 88 is fixed to frame member 60 and includes bearings 90 through which drive shaft 86 extends for rotatably mounting drive shaft 86 to frame member 60. A drive shaft cap 92 restrains the drive pulley 44, 50 on drive shaft 86. The opposite end of drive shaft 86 extends through frame member 60 and a driven pulley 94 is mounted thereon.

A servomotor 96 is provided, having an output shaft 98 with a pulley 100 thereon which is in the same plane as driven pulley 94.

As shown best in FIGS. 3 and 8, a timing pulley 102 is rotatably mounted on a tightener shaft 104 via bearings 106, with tightener shaft 104 in turn, being mounted to frame member 60. A shaft cap 108 restrains timing pulley 102 thereon. The opposite end of tightener shaft 104 extends through an elongated slot 110 (FIG. 3) in frame member 60, and is securely held at a desired position of slot 110 by a washer 112 and nut 114. In this manner, the position of tightener shaft 104 in slot 110 can be adjusted to a desired position.

An endless drive belt 116 extends around motor pulley 100, timing pulley 102 and driven pulleys 94 in order t rotate drive pulleys 44 and 50, and thereby rotate endless belts 40 and 42 in order to advance cups 20 in second infeed tube 34. Since the position of tightener shaft 104 in slot 110 can be adjusted to a desired position, drive belt 116 can be maintained taut about pulleys 44, 50, 100 and 102.

As discussed above, a problem with the prior art is that, because the cups are made of foam material, that is, a material sold under the trademark "STYROFOAM," they tend to stick together, and it is difficult to separate the cups. As a result, it is impossible to provide a high speed operation.

Therefore, referring now to FIGS. 3-5, 9 and 10-17, a reversed venturi air pressure arrangement 120 for separating nested forwardmost foam cup 20*a* from the next or second foam cup 20*b*, includes a venturi tube 122 and an adjacent venturi ring 124 connected to a frame member 126 at the outlet end of second infeed tube 34.

Figure 4:
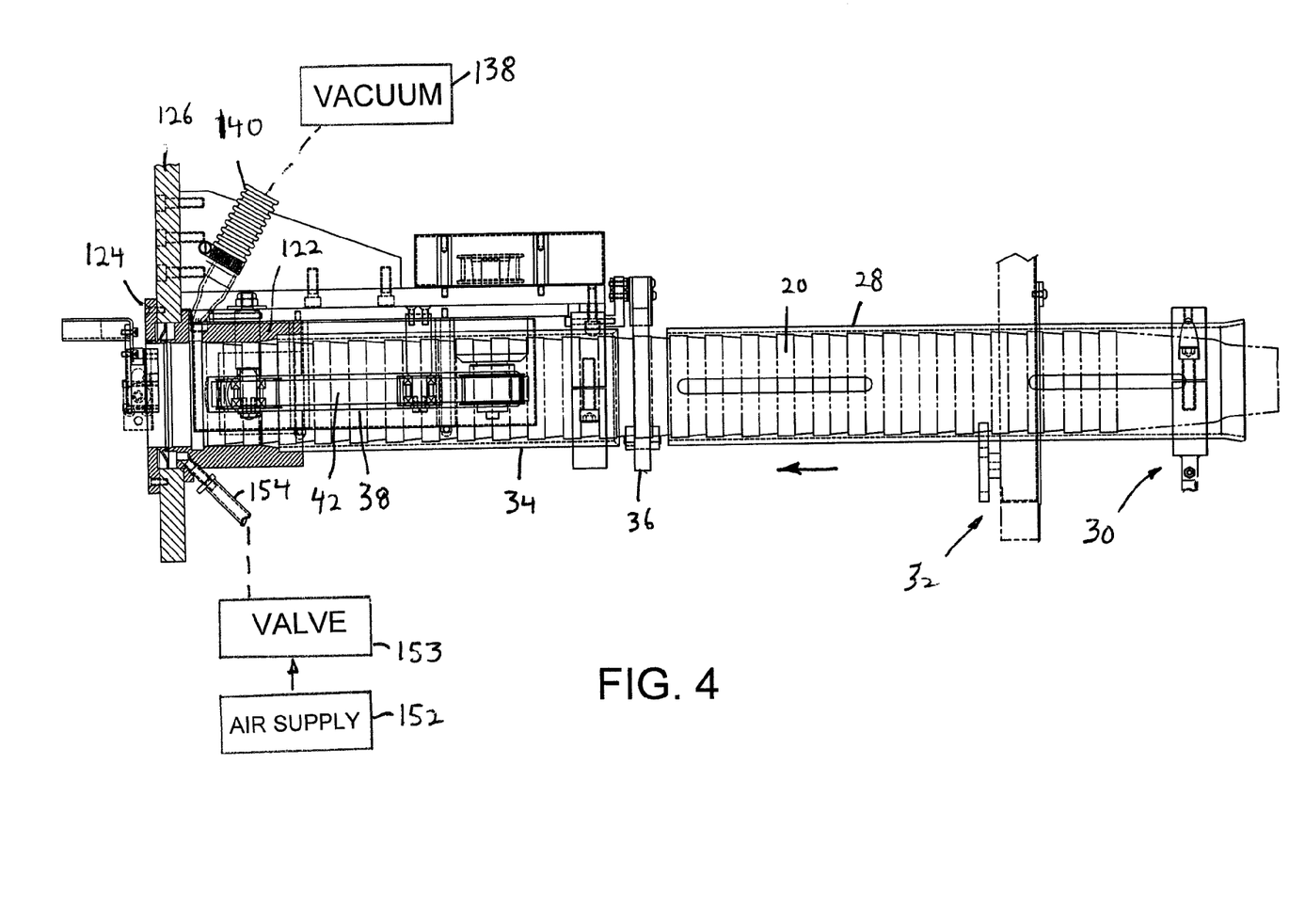
FIG. 4 is a side elevational view, partly in section, of the infeed assembly.
Figure 10:
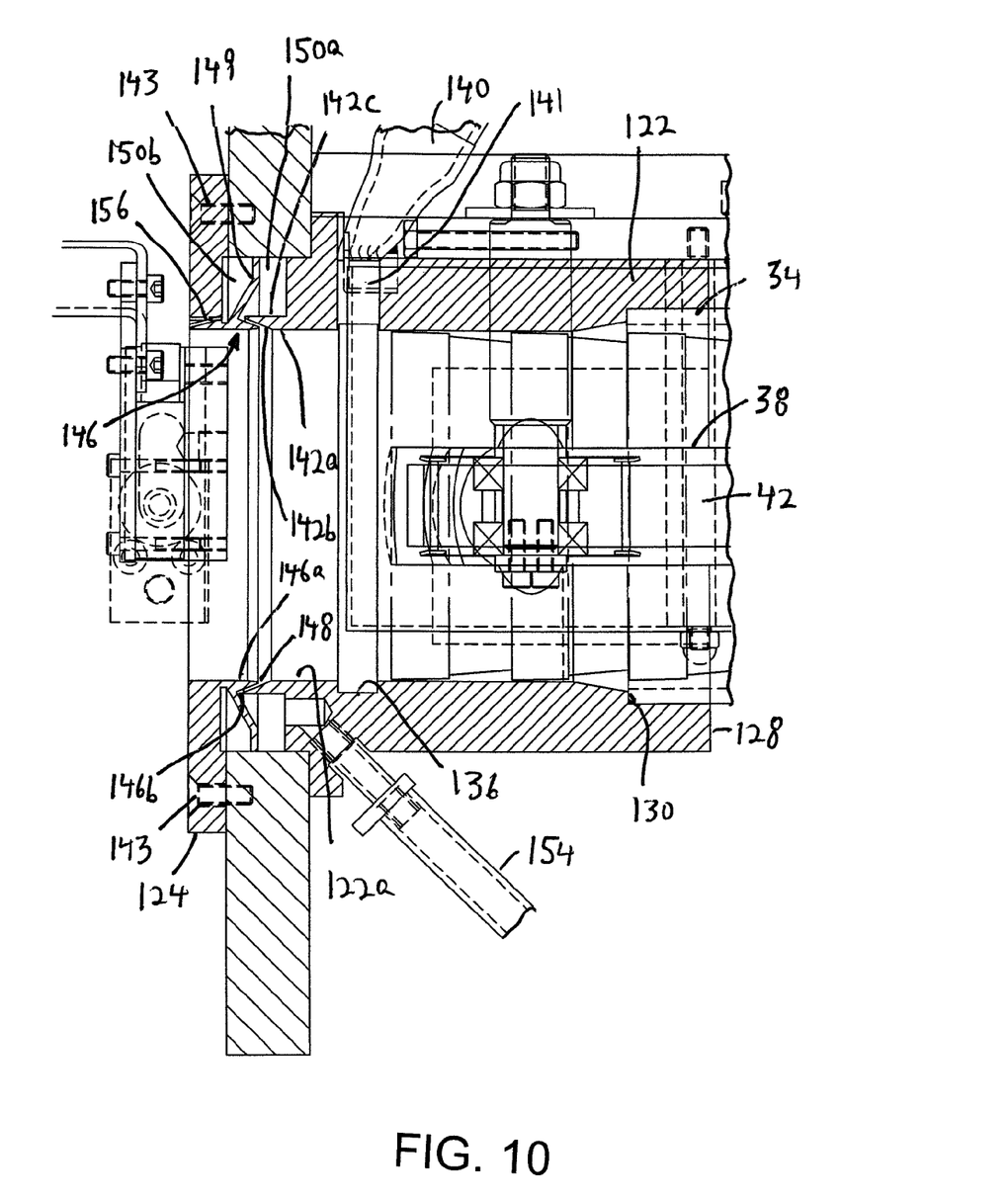
FIG. 10 is an enlarged longitudinal cross-sectional view of the outlet end of the infeed assembly of FIG. 3.
Figures 11, 12, 13, 14:
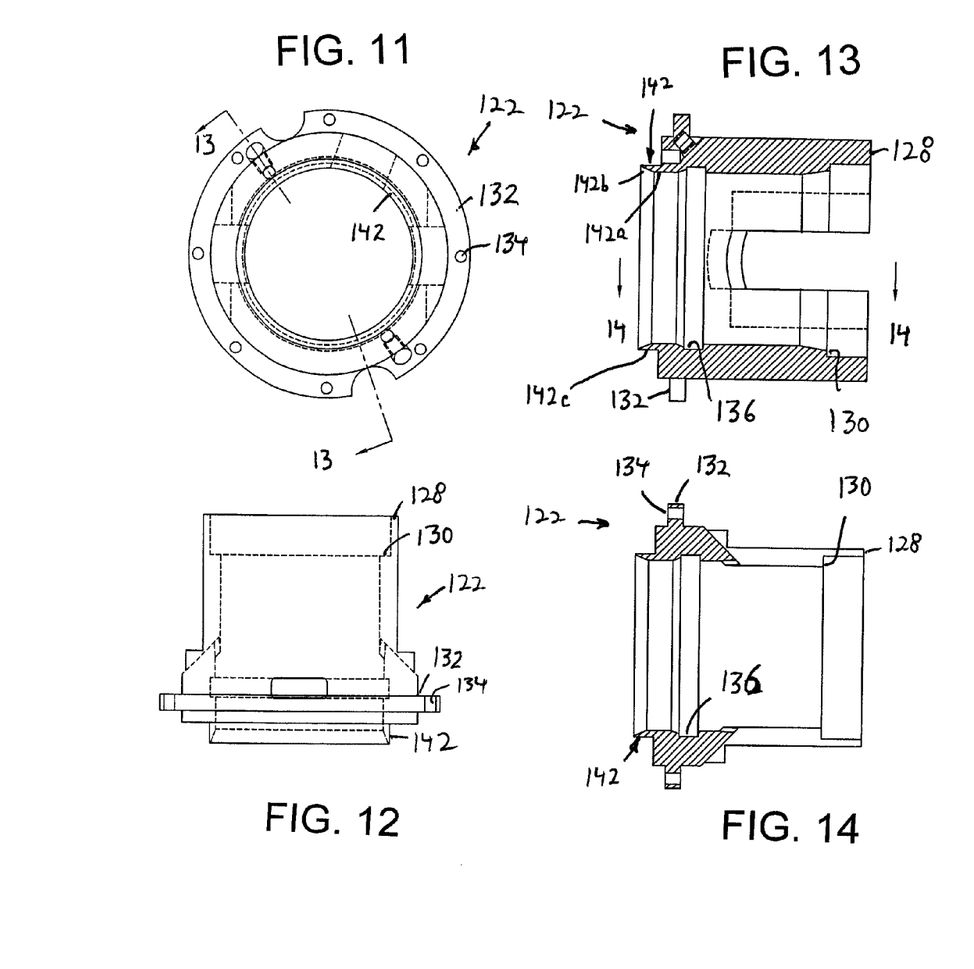
FIG. 11 is a front elevational view of the venturi tube connected at the outlet end of the second infeed tube.
FIG. 12 is side elevational view of the venturi tube.
FIG. 13 is a cross-sectional view of the venturi tube, taken along line 13-13 of FIG. 11.
FIG. 14 is a cross-sectional view of the venturi tube, taken along line 14-14 of FIG. 13.
Figure 15:
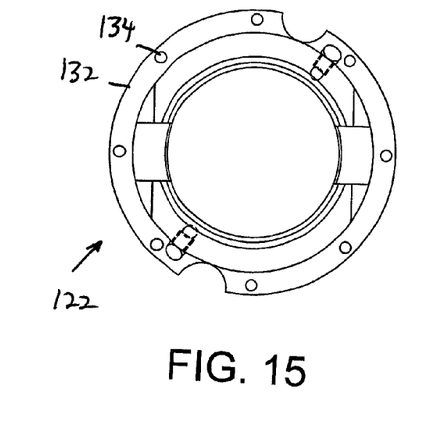
FIG. 15 is a rear elevational view of the venturi tube.
Figure 16:
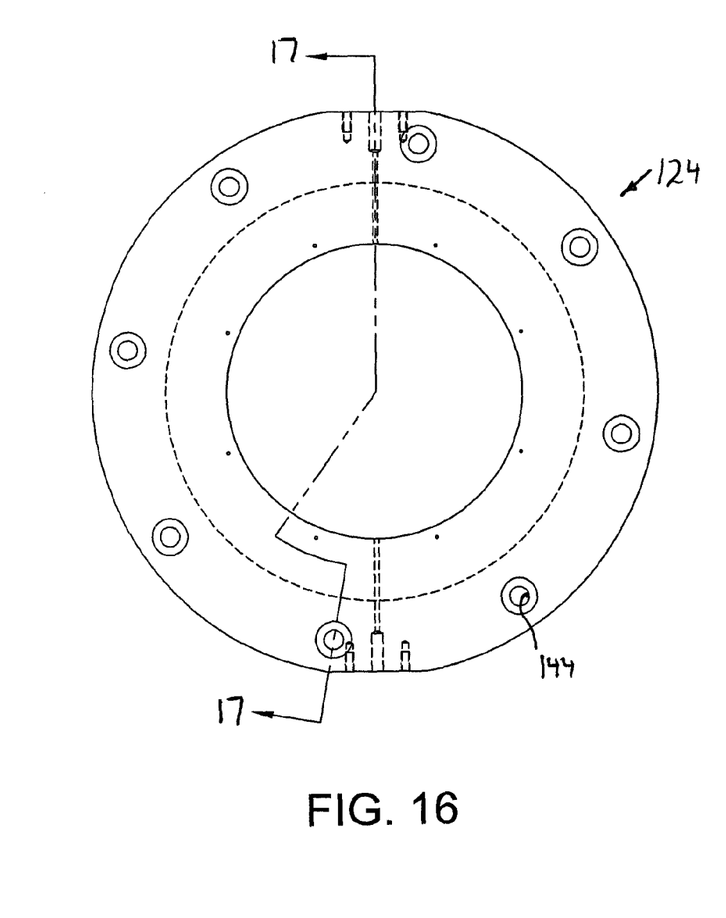
FIG. 16 is a front elevational view of the venturi ring connected at the outlet end of the second infeed tube.
Figure 17:
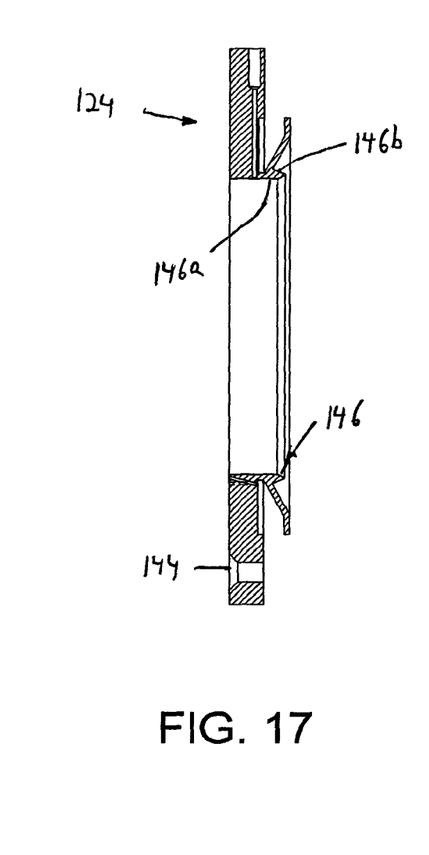
FIG. 17 is a cross-sectional view of the venturi ring, taken along line 17-17 of FIG. 16.

Venturi tube 122 has a distal end 128 which is cut away to form a shoulder 130 that engages over the outlet end of second infeed tube 34, as best shown in FIGS. 4 and 10. The proximal end of venturi tube 122 includes an outer annular flange 132 having holes 134 spaced therealong, and through which bolts 135 can extend for securing venturi tube 122 to frame member 126.

Venturi tube 122 includes an internal annular vacuum slot 136 that is intended to apply a vacuum to the foam cup 20*b* at the next or second foam cup position after the forwardmost foam cup 20*a* has been discharged onto a mandrel 18. In this regard, a vacuum supply 138 (FIGS. 4 and 10) is connected through a tube 140 to through bores 141 in venturi tube 122 in communication with internal annular vacuum slot 136. The vacuum is a low level vacuum that is always applied. The reason for applying the low level vacuum is that second infeed tube 34 is angled downwardly toward the mandrel 18 at the loading position, and belts 40 and 42 only engage the third or fourth foam cup. Therefore, once the forwardmost foam cup 20*a* is loaded onto the mandrel 18, the next or second foam cup 20*b* may slip out of position. Therefore, the low level vacuum is applied to retain the next or second foam cup 20*b* in position until a time when it is ready to be loaded onto the next mandrel 18.

The proximal end of venturi tube 122 has an axial directed, annular projection 142 extending from the forward or proximal end face of venturi tube 122. Annular projection 142 has an inner annular surface which includes a first inner annular surface portion 142*a* that is coplanar with the inner annular surface 122*a* of venturi tube 122 and continuous therewith and an outwardly inclined inner annular surface portion 142*b* that is continuous from the end of inner annular surface portion 142*a*. The diameter of the outer surface portion 142*c* of annular projection 142 is much less than the outer diameter of venturi tube 122.

Venturi ring 124 is mounted to frame member 126 by bolts 143 extending through openings 144 around an outer circumference thereof. Venturi ring 124 includes an axially directed, rearwardly extending, annular projection 146 having an inner annular surface 146*a* that is coplanar with the inner annular surface 122*a* of venturi tube 122 and an inclined outer annular surface 146*b* that is angled by the same amount as outwardly inclined inner annular surface portion 142*b*. Inclined upper annular surface 146*b* is arranged in parallel, slightly spaced apart, opposing relation with outwardly inclined inner annular surface portion 142*b* so as to form a small annular gap therebetween which forms a narrow annular venturi opening 148 in the shape of a cone. It is important that venturi opening 148 is oriented to direct pressurized air rearwardly to a position between the forwardmost cup 20*a* and the next or second cup 20*b*. In this regard, venturi opening 148 is angled rearwardly to the direction of movement of cups 20*a* and 20*b*, and therefore is a reversed venturi air arrangement. It will be appreciated, however, that venturi opening 148 can also be, for example, perpendicular to the direction of movement of cups 20*a* and 20*b*, as long as the air exiting therefrom is forced to travel rearwardly, that is, in a direction opposite to the direction of movement of cups 20*a* and 20*b*. In other words, the air flow from the reversed venturi arrangement need only have a vector component which is directed rearwardly in a direction opposite to the direction of movement of cups 20*a* and 20*b*.

As a result, the compressed air travels to the bottom of the forwardmost cup 20*a* and has only one way to go, that is, to force cup 20*a* out of the nesting arrangement in a bullet like manner which clearly and absolutely separates the forwardmost cup 20*a* from the next cup 20*b*. Because there are no discrete number of air jets, the only escape for the pressurized air is to push the forwardmost cup 20*a* away from the next or second cup 20b, thereby preventing sticking together of cups 20a and 20b and providing for easy separation thereof. It will be appreciated that second infeed tube 34 provides a close fit with cups 20, so that the compressed air can only travel to the space between cups 20a and 20b and cannot travel around cup 20b. As a result, all the air is used to separate cups 20a and 20b.

An air chamber is defined between the rear facing surface of venturi ring 124, the forward facing surface of venturi tube 122 and projections 142 and 146. An annular wall 149 extends outwardly from the distal end of upper annular surface 146b in order to divide the air chamber into a first air chamber 150a which supplies pressurized air to narrow annular venturi opening 148 and an adjacent second air chamber 150b. A pressurized air supply 152 supplies pressurized air through a solenoid valve 153 and a tube 154 to first air chamber 150a and narrow annular venturi opening 148.

It is also desirable to provide pressurized air forwardly of venturi ring 124 in order to aid in the movement of the forwardmost cup 20a onto the mandrel 18. For this reason, venturi ring 124 includes small inclined openings 156 that are angled inwardly in the forward direction toward the mandrel 18. Thus, as the forwardmost cup 20a is blown toward mandrel 18, pressurized air from a pressurized air supply 158 (FIG. 10A) is supplied through a solenoid valve 160 and a tube 162 to second air chamber 150b and through inclined openings 156 to aid in blowing the forwardmost cup 20a onto the mandrel 18.

Because of the aforementioned arrangement, it is easy to separate cups 20a and 20b, and to shoot or push the forwardmost cup 20a onto the mandrel 18 quickly and easily. As a result, printing of foam cups can occur at a high speed, as with conventional cups.

Venturi ring 124 further includes a radial through bore 164, and a sensor 166, such as an optical sensor, which detects the presence of a forwardmost cup 20a at this position. When such a cup 20a is present, through bore 164 blocks the output for optical sensor 166 to detect the presence of cup 20a.

In operation, as cups 20 are pushed forward in second infeed tube 34 by belts 40 and 42, vacuum pressure is applied to internal annular vacuum slot 136. However, the force applied by belts 40 and 42 is greater than that of the vacuum such that the first or forwardmost cup 20a is pushed to near the outlet opening of venturi ring 124, and the lip of second cup 20b is positioned adjacent internal annular vacuum slot 136. At this position, movement of belts 40 and 42 is stopped. As mandrel 18 is moved to a position in front of venturi ring 124, or at a time, immediately therebefore, a blast of pressurized air is supplied through narrow annular venturi opening 148, which provides an annular ring of pressurized air which travels to the space between first cup 20a and second cup 20b. The compressed annular ring of air travels to the bottom of the forwardmost cup 20a and has only one way to go. The only escape for the pressurized air is to push the forwardmost cup 20a away from the next or second cup 20b, that is, to force this cup out of the nesting arrangement with the next cup 20b in a bullet like manner which clearly and absolutely separates cup 20a from the next cup 20b, so that the problem of sticking of cups is thereby overcome. As a result, the forwardmost cup 20a is shot onto the mandrel 18. Further, pressurized air through small inclined openings 156 also serve to blow the forwardmost cup 20a onto the mandrel 18.

At this time, there is no cup at the forwardmost position, which is detected by sensor 166, and as a result, belts 40 and 42 are driven to move the next cup 20b to the forwardmost position, and the operation continuously repeats in this cycle.

It will therefore be appreciated that the present invention provides a reversed venturi air pressure arrangement for separating nested foam cups that overcomes the problems in the prior art. This occurs by providing an annular ring of compressed air which is supplied between two nested foam cups in order to separate the two cups. The compressed air travels to the bottom of one nested cup and has only one way to go, that is, to force the cups apart out of the nesting arrangement, which clearly and absolutely separates these nested cups, so that the problem of sticking of the cups is thereby overcome.

Although the present invention has been discussed in relation to a printing operation, the present invention is not limited thereto. For example, the present invention can be used for separating nested articles and feeding the separated articles to other processing equipment such as, but not limited to, labeling equipment, leak testing equipment, marking equipment, filling equipment, etc.

Although the present invention has been discussed in relation to foam cups, the present invention is not limited thereto, and can therefore be applied to other types of cups or even other articles of manufacture in a nested arrangement.

Further, although the present invention has been discussed with respect to narrow venturi openings 148 being annular, it will be appreciated that use of the word annular is intended to mean annular or substantially annular such that the majority of the compressed air travels to the bottom of the received nested cup and has only one way to go, that is, to force this cup out of the nesting arrangement to clearly and absolutely separate this cup from the next adjacent nested cup, that is, the only escape for the majority of the pressurized air is to push the nested cups away from each other, thereby preventing sticking together of cups and providing for easy separation thereof.

More importantly, since, as discussed above, the present invention is not limited to annular cups, but can be applied to other types of cups or even other articles of manufacture in a nested arrangement, it will be appreciated that the articles do not have to be annular. For example, the articles can have an oval, square, rectangular, triangular, etc. cross-sectional configuration. In such case, use of the word "annular" above is only one example of a specific shape and the present invention is not limited thereby. Rather, the more generic word to describe this and other shapes is "peripheral" which generically describes the outer boundary of the article, whether the outer boundary is annular, oval, square, etc. and use of the word "peripheral" in the claims is intended to encompass all such shapes.

Further, the use of a large number of discrete jets which mimics the present peripheral arrangement is intended to be encompassed by the present invention. Thus, the word "peripheral" or the word "annular" in the claims is intended to cover this arrangement as well.

Having described a specific preferred embodiment of the invention with reference to the accompanying drawings, it will be appreciated that the present invention is not limited to that precise embodiment, and that various changes and modifications can be effected therein by one of ordinary skill in the art without departing from the scope or spirit of the invention as defined by the appended claims.

What is claimed is:

1. An apparatus for separating nested articles and supplying a forwardmost nested article onto a mandrel, comprising:
 a support for guiding a stack of nested articles in a first direction from one location to another location in a nested arrangement; and
 at least one peripheral opening in the support for supplying incoming pressurized air substantially circumferentially to a position between a forwardmost article of the stack and a nested adjacent article such that the pressurized air travels in a second direction having a component opposite to the first direction and is substantially prevented from escaping through said position between the forwardmost article of the stack and the nested adjacent article by said incoming pressurized air, and such that the pressurized air travels in a cavity between the forwardmost article and the nested adjacent article to separate the forwardmost article from the next adjacent article, the peripheral opening being angled with respect to said first direction;

wherein the support includes a first peripheral member having a projection with a first peripheral angled surface and an adjacent second peripheral member having a projection with a second peripheral angled surface adjacent to and spaced slightly away from said first angled surface to define said peripheral opening therebetween.

2. An apparatus according to claim 1, wherein the peripheral opening is a narrow peripheral venturi opening.

3. An apparatus according to claim 1, wherein said peripheral opening is in the shape of a cone.

4. An apparatus according to claim 1 wherein said articles are foam cups.

5. An apparatus according to claim 1, further comprising at least one second opening in the support downstream of said peripheral opening for supplying pressurized air to the forwardmost article separated by the peripheral supply of pressurized air from the peripheral opening, in order to further advance said forwardmost article.

6. An apparatus according to claim 5, wherein the at least one second opening is angled with respect to the first direction.

7. An apparatus according to claim 6, wherein the at least one second opening is a narrow venturi opening.

8. An apparatus according to claim 1, further comprising a moving arrangement for moving the nested articles to a position to be acted upon by the peripheral supply of pressurized air from said peripheral opening.

9. An apparatus according to claim 8, wherein said moving arrangement includes:
at least one opening in the support,
at least one endless belt extending through said at least one opening for engaging said articles to move said articles along the support, and
a drive arrangement for rotating said at least one endless belt.

10. An apparatus for separating nested foam cups and supplying a forwardmost nested cup onto a mandrel, comprising:
a support for guiding a stack of nested foam cups in a first direction to a mandrel for printing thereon;
a first annular opening in the support for supplying an annular supply of incoming pressurized air to a position between a forwardmost one of said nested foam cups and a next adjacent foam cup in a nesting arrangement with the forwardmost foam cup such that the pressurized air travels in a second direction having a component opposite to the first direction and is substantially prevented from escaping through said position between the forwardmost foam cup of the stack and the next adjacent foam cup by said incoming pressurized air and such that the pressurized air travels in a cavity between the forwardmost cup and the nested adjacent cup to separate the forwardmost cup from the next adjacent cup, the first annular opening is angled with respect to said first direction;
at least one second opening in the support downstream of said first annular opening for supplying pressurized air to the forwardmost cup separated by the annular supply of pressurized air from the first annular opening, in order to further advance said forwardmost cup toward the mandrel;
wherein the support includes a first member having a projection with a first annular angled surface and an adjacent second member having a projection with a second annular angled surface adjacent to and spaced slightly away from said first angled surface to define said first annular opening therebetween.

11. An apparatus according to claim 10, wherein the first annular opening is a narrow annular venturi opening.

12. An apparatus according to claim 10, wherein said first annular opening is in the shape of a cone.

13. An apparatus according to claim 10, wherein the at least one second opening is angled with respect to the first direction and extends toward the mandrel in an opposite direction from said first annular opening.

14. An apparatus according to claim 13, wherein each said second opening extends along an annular, conical area.

15. An apparatus according to claim 10, further comprising a moving arrangement for moving the nested foam cups to a position to be acted upon by pressurized air from said first annular opening.

16. An apparatus according to claim 15, wherein said moving arrangement includes:
at least one opening in the support,
at least one endless belt extending through said at least one opening for engaging said foam cups to move said foam cups along the support, and
a drive arrangement for rotating said at least one endless belt.

* * * * *